United States Patent [19]
Cavalloni

[11] Patent Number: 5,524,491
[45] Date of Patent: Jun. 11, 1996

[54] COMBINED FORCE, STRAIN AND SOUND EMISSION TRANSDUCER

[75] Inventor: Claudio Cavalloni, Winterthur, Switzerland

[73] Assignee: K.K. Holding AG, Switzerland

[21] Appl. No.: 61,321

[22] Filed: May 14, 1993

[30] Foreign Application Priority Data

May 15, 1992 [CH] Switzerland .......................... 01558/92

[51] Int. Cl.$^6$ .................................................. G01N 29/14
[52] U.S. Cl. ............................................... 73/587; 73/774
[58] Field of Search ............................... 73/774, 587, 761

[56] References Cited

U.S. PATENT DOCUMENTS

| | | |
|---|---|---|
| 3,608,370 | 9/1971 | Vollenweider et al. . |
| 3,921,442 | 11/1975 | Soloway . |
| 3,937,068 | 2/1976 | Joy . |
| 4,011,473 | 3/1977 | Massa . |
| 4,019,373 | 4/1977 | Freeman et al. . |
| 4,314,481 | 2/1982 | Wolfer et al. ............................ 73/774 |
| 4,658,650 | 4/1987 | Yorinaga et al. ......................... 73/654 |
| 5,003,824 | 4/1991 | Fukada et al. . |
| 5,029,474 | 7/1991 | Schulze . |
| 5,078,149 | 1/1992 | Katsumata et al. . |
| 5,085,079 | 2/1992 | Holdren et al. . |
| 5,168,758 | 12/1992 | Wolfer .................................... 73/774 |
| 5,357,486 | 10/1994 | Pearce .................................... 367/159 |

FOREIGN PATENT DOCUMENTS

| | | |
|---|---|---|
| 0336224 | 10/1989 | European Pat. Off. . |
| 59-35114 | 2/1984 | Japan . |
| 2190495 | 7/1985 | United Kingdom . |

Primary Examiner—Richard Chilcot
Assistant Examiner—Max H. Noori
Attorney, Agent, or Firm—Barnes & Thornburg

[57] ABSTRACT

The invention relates to a combined force, strain and sound emission transducer and a coupling method. The sound emission sensor (1) forms an assembly unit and is intended specially for measuring high-frequency sound emissions (up to around 2 MHz). It consists of a piezoelectric measuring element (9), an assembly base (8) with circumferential coupling diaphragm (7), and an encapsulant (10) partly surrounding the measuring element (9) and partially the assembly base. The assembly unit could contain also a resistor (11) paralleling the measuring element (9) and forming a high-pass filter with the capacitance of the sensor (1). The coupling diaphragm (7) lies in a recess (14) of the housing bottom (4), whose bottom surface (5) is at a distance from the measuring object (15) corresponding to the pre-stressing distance s when the diaphragm (7) is unloaded. Coupling the sound emission sensor (1) to the measuring object (15) is achieved so that the bottom surface (5) is pressed onto the measuring object (15) and fixed thereto, whereby the diaphragm (7) is loaded and the assembly base (8) is coupled to the surface of the measuring object (15). The invention makes possible miniaturization and more rational production of the transducer as well as improving high-frequency transmission.

9 Claims, 1 Drawing Sheet

COMBINED FORCE, STRAIN AND SOUND EMISSION TRANSDUCER

The invention relates to a combined force, strain and sound emission transducer, a measuring device and a coupling method.

Force and strain sensors fitted into major force conducting points of automated machine tools and initiating tool change as part of a monitoring system are known. In addition to the machining forces, moments and strains, machine noises or sound conducted through solids also play an important role in the monitoring of machining operations. Already there are drilling machine monitors which detect drill breakage from the change in the spectrum of the machine noise. The combination of force, strain and machine noise measuring in a single transducer is attractive, because only one transducer mounting point is then necessary. Furthermore in finish machining, measuring the machine noise yields information additional to the force and strain measurements. In rough machining, force and strain measuring tells more than the machine noise measurments. Combined force, strain and machine noise transducers of this kind are already in use at the present time.

Sound conducted through solids is measured with an accelerometer. A sensor of this kind is described in European patent application 0 336 224 A1 corresponding to U.S. Pat. No. 5,029,474. This sensor serves for testing a measuring object, in particular a reactor vessel. It contains a piezo element and a seismic mass and is tuned to a resonant frequency between 1 kHz and 100 kHz. Placed between the component and the accelerometer as coupling medium is typically a soft plate screwed to the measuring object.

However not only the analysis of relatively low-frequency sound waves (conducted through solids, 10 kHz to about 20 kHz) is of interest, but also that of high-frequency sound emission up to some 2 MHz. This requires a still higher resonant frequency and still better coupling of the sound emission sensor. Moreover fitting individual sensors is very expensive, so that a certain standardization and preassembly are desirable. The purpose of the present invention is to overcome the disadvantages named. To achieve this object the sound emission sensor is in the form of an assembly unit comprising a piezoelectric element, an assembly base with coupling diaphragm and an encapsulant enclosing the piezoelectric element and in part the assembly base. The coupling diaphragm lies in a recess of the housing bottom whose surface is at a distance s from the measuring object when the coupling diaphragm is unloaded. Coupling the sound emission sensor to the measuring object is achieved by pressing the bottom surface of the housing onto the measuring object and fixing it thereto. This preloads the coupling diaphragm and couples the assembly base to the measuring object. A resistor may be provided in parallel in the assembly unit with the measuring element to form a high-pass filter with the capacitance of the measuring element.

Below the invention is explained with reference to the drawings.

DETAILED DESCRIPTION OF THE DRAWINGS

Figure 1:
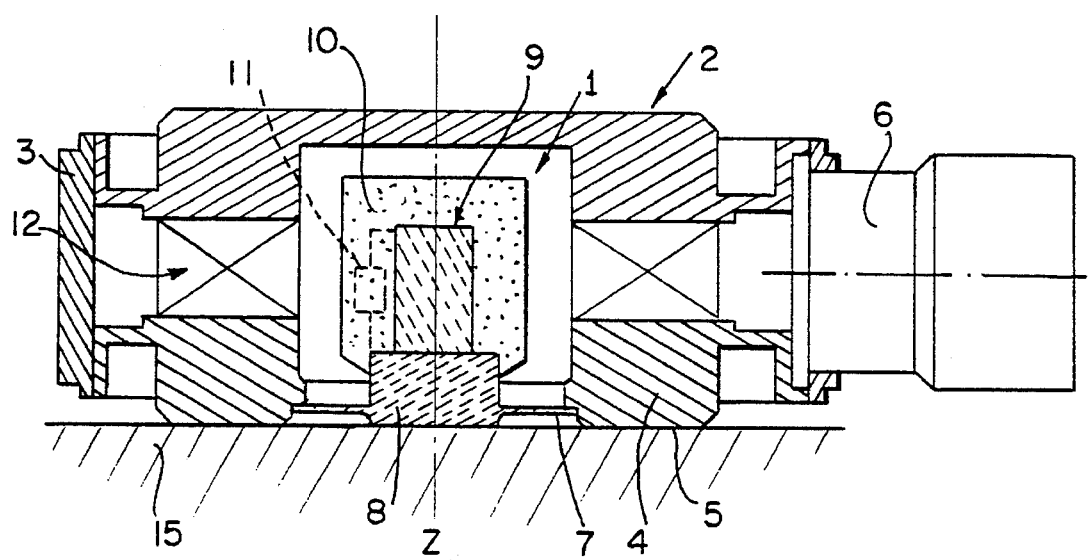

FIG. 1 a combined force, strain and sound emission transducer with sound emission sensor according to the invention (cross section).

Figure 2:
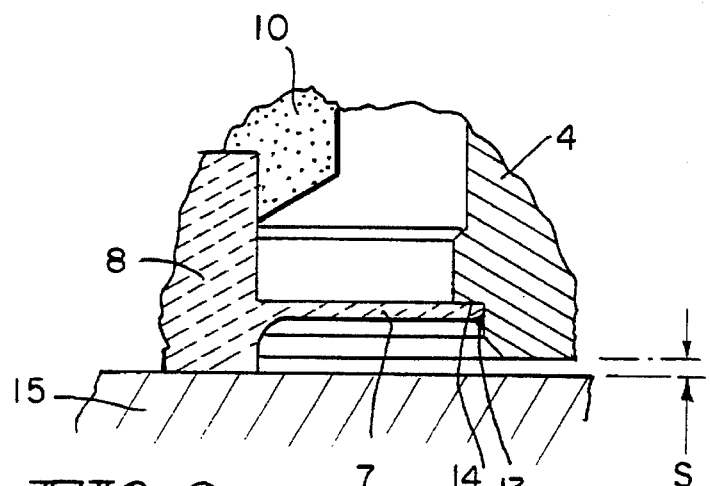

FIG. 2 coupling mechanism employing a coupling diaphragm according to the invention.

The combined force, strain and sound emission transducer shown in FIG. 1 has a sound emission sensor according to the invention. The forces (one- or multi-dimensional) are measured by the piezoelectric force measuring element 12. They are introduced via the housing 2 to which a tubular outer casing 3 is flanged. 1 denotes the sound emission sensor according to the invention, consisting of the piezoelectric measuring element 9, the assembly base 8 with coupling diaphragm 7, and the encapsulant 10 with the shunt resistor 11, which may also be fitted externally or omitted. 4 is the housing bottom, 5 the bottom surface, 6 the connector accommodating the signal lines. The piezo element 9 may be a polarized piezo element of sintered ceramic, its polarization axis lying in the main axis z of the system. However it may also be a suitably cut monocrystal of piezoelectric material such as quartz, or a piezoelectric polymer film such as polyvinylfluoride (PVDF) glued onto a metal plate for example. The sound emission sensor may also include a seismic mass.

The coupling mechanism of the sound emission sensor 9 so important for transmitting high-frequency sound waves is shown in detail in FIG. 2. The detail is indicated by a circle in FIG. 1. The reference numbers are the same as those used already in FIG. 1. Around its circumference the assembly base 8 carries a coupling diaphragm 7, which fits into a recess 14 in the housing bottom 4 and is joined to this, by weldment 13 for example. The housing bottom 4, coupling diaphragm 7 and assembly base 8 may be fabricated in one piece. The diaphragm 7 decouples the sound emission sensor 1 from the force or strain signals as the case may be. Before coupling the sound emission sensor 1 to the measuring object 15, the surface 5 of the housing bottom 4 is at a distance s from the surface of the measuring object 15. The coupling method presented involves pressing the bottom surface 5 onto the measuring object 15 and fixing it to this so that the coupling diaphragm 7 is loaded and the assembly base 8 is coupled to the surface of the measuring object 15. Further increase of the pressing force onto the housing 2 does not alter the pressing force of the assembly base 8 onto the measuring object 15. The coupling conditions remain defined and constant, which is an essential prerequisite when assessing sound emission signals for diagnostic purposes. Protection of the coupling diaphragm 7 from overload and plastic deformation is assured also.

The resistor 11 shown in FIG. 1 (parallel with the piezoelectric measuring element 9) forms an RC element together with the measuring element 9 (C: capacitance of measuring element 9), i.e. a high-pass filter. As shown in the drawing, the resistor 11 may be integrated in the encapsulation 10, though it may also be outside the sound emission sensor 1. By varying the resistance 11 the frequency range filtered out and passing to the preamplifier can be adjusted. This may also be achieved additionally or exclusively by providing the preamplifier with a switchable high-pass filter. The shunt resistor 11 can then be omitted.

By means of the invention described, the sound emission sensor is miniaturized and in particular made much more efficient by a new kind of coupling technique in the high frequency range. This will open up new application possibilities especially on machine tools.

I claim:

1. Combined force, strain and sound emission transducer characterized by:

a sound emission sensor for sensing sounds of 100 KHz and above and forming one assembly unit comprising a piezoelectric element, an assembly base with coupling diaphragm and an encapsulant surrounding the piezoelectric element and the assembly base in part:

the coupling diaphragm lying in a recess in the bottom of a housing of the transducer; and the surface of the bottom of the housing having a distance from a measuring object when the coupling diaphragm is unloaded.

2. Transducer according to claim 1, characterized by the piezoelectric element consisting of an axially polarized piezoceramic.

3. Transducer according to claim 1, characterized by the assembly unit including a seismic mass.

4. Coupling method for the sound emission sensor of a transducer of claim 1, characterized by the bottom surface of the housing being pressed onto the measuring object and fixed to it, so that the coupling diaphragm is stressed and the assembly base is coupled to the surface of the measuring object with an exactly definable force.

5. A combined transducer including a sound emission sensor and at least one of a force and strain sensor in a common housing having a bottom surface to be mounted to a measuring object, said sound emission sensor for sensing sounds of 100 KHz and above and forming an assembly unit comprising:

a piezoelectric element on an assembly base which includes a coupling diaphragm; and said coupling diaphragm lying in a recess in the bottom surface of the housing with the bottom surface of the assembly base extending a preselected distance beyond the bottom surface of the housing when the coupling diaphragm is unloaded and the diaphragm being loaded with an exactly definable force when the bottom surface of the assembly base and the housing are coupled and mounted respectively to the measuring object.

6. A transducer according to claim 5 wherein the assembly unit includes encapsulant surrounding the piezoelectric element and a portion of the base element.

7. Combined force, strain and sound emission transducer characterized by a found emission sensor forming one assembly unit comprising:

a piezoelectric element;

a variable electrical resistor, which with the piezoelectric element forms a high-pass filter;

an assembly base with coupling diaphragm;

an encapsulant surrounding a piezoelectric element and the assembly base in part the coupling diaphragm lying in a recess in the bottom of a housing of the transducer; and the surface of the bottom of the housing having a distance from a measuring object when the coupling diaphragm is unloaded.

8. Combined force, strain and sound emission transducer characterized by a sound emission sensor forming one assembly unit comprising:

a piezoelectric element;

an assembly base with coupling diaphragm;

an encapsulant surrounding a piezoelectric element and the assembly base in part the coupling diaphragm lying in a recess in the bottom of a housing of the transducer;

the surface of the bottom of the housing having a distance from a measuring object when the coupling diaphragm is unloaded; and said transducer being connected to a preamplifier containing a switchable high-pass filter.

9. A combined transducer including a sound emission sensor and at least one of a force and strain sensor in a common housing having a bottom surface to be mounted to a measuring object, said sound emission sensor forming an assembly unit comprising:

a piezoelectric element on an assembly base which includes a coupling diaphragm;

a resistor in parallel with the piezoelectric element to form a high-pass filter; and said coupling diaphragm lying in a recess in the bottom surface of the housing with the bottom surface of the assembly base extending a preselected distance beyond the bottom surface of the housing when the coupling diaphragm is unloaded and the diaphragm being loaded when the bottom surface of the surface of the assembly base and the housing are coupled and mounted respectively to the measuring object.

* * * * *